United States Patent Office 2,859,495
Patented Nov. 11, 1958

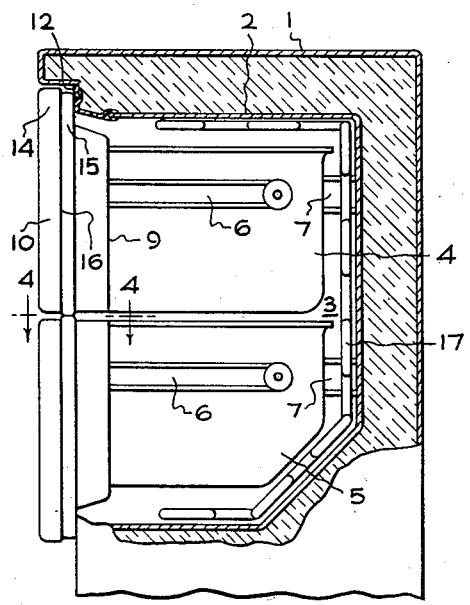

2,859,495

REFRIGERATOR CABINET INCLUDING CLOSURE SEALING MEANS

Edward H. Roberts, Jeffersontown, Ky., assignor to General Electric Company, a corporation of New York Application December 5, 1955, Serial No. 551,072

1 Claim. (Cl. 20—69)

The present invention relates to refrigerator cabinets and more particularly to a cabinet including a plurality of closure members and improved gasket means for sealing the joint or space between opposed edges of adjacent closure members.

In order to seal the refrigerated space within a refrigerator cabinet, the closure member normally carries a resilient gasket on the inner peripheral face thereof for engagement with a mating face portion of the cabinet defining the access opening. In the case of cabinets having more than one closure member, it has been the general practice to employ a mullion extending across the access opening between adjacent closure members to provide a surface for sealing engagement with the gasket. Where the closure members are in the form of two doors, the mullion obstructs access to the cabinet. When the closure members are in the form of two or more drawers, or more specifically drawer fronts, arranged one above the other, the provision of a mullion between the adjacent drawers limits the permissible depth thereof since the storage portions of the drawers must clear the mullion to permit proper operation thereof.

It is a primary object of the present invention to provide a mullionless multi-closure arrangement for a refrigerator cabinet including an improved gasket assembly for sealing the joints or spaces between adjacent edges of the closure members.

Another object of the present invention is to provide a gasket assembly for sealing the space or joint between adjacent closure members and means mounted on the closure member for engagement with the cabinet upon closing of the members to effect deformation of the gasket and sealing of the joint or space.

A further object of the invention is to provide a gasket assembly for sealing mullionless joints between adjacent closure members adapted to permit the use of the same gasket as that employed for sealing the remaining edge portions of the closure members.

Further objects and advantages of the invention will become apparent as the following description proceeds and the features of novelty which characterize the invention will be pointed out with particularity in the claims annexed to and forming part of the specification.

In carrying out the present invention, there is provided a gasket seal for storage cabinets having a plurality of closure members including a gasket arrangement or assembly particularly adapted for sealing the opposed or mating edges of adjacent closure members. The seal between the opposed or mating edges is obtained by means of a tubular gasket mounted on at least one of the opposed edges and means operable upon closing of the closure member carrying the tubular gasket for deforming the gasket and advancing a side portion thereof into the space or joint between the opposed edges. Preferably the gasket employed in the practice of the present invention comprises a thin, flexible, substantially non-resilient outer sheath and a resilient compressible filler body disposed within the sheath and extending the length thereof. The filler body is formed of inorganic filamentary material such as glass fibers bonded together by a resinous binder and occupies at least a substantial portion of the space within the tubular sheath.

For a better understanding of the invention, reference is made to the following description taken in conjunction with the accompanying drawings in which:

Fig. 1 is a side elevation view, partly in section, of a refrigerator incorporating one embodiment of the present invention;

Fig. 2 is an enlarged sectional view of a portion of the cabinet of Fig. 1 showing the refrigerator cabinet closure members in a closed position;

Fig. 3 is a view similar to Fig. 2 with the closure members in an open position; and Fig. 4 is an enlarged partial sectional view taken generally along line 4—4 of Fig. 1.

While it will be obvious that the present invention is applicable to the sealing the space or joint between adjacent doors of a multi-door refrigerator, the invention will be particularly described with reference to a refrigerator cabinet comprising a plurality of storage drawers wherein the sealing arrangement of the present invention is employed to seal a mullionless joint or space between adjacent drawer fronts.

Referring to Fig. 1 of the drawing, there is shown a refrigerator cabinet comprising spaced inner and outer walls 1 and 2 with the space therebetween being filled with suitable heat insulation. The inner walls 2 define a refrigerated compartment 3 for the storage of foodstuffs or the like. Drawers 4 and 5 slidably supported within the storage compartment 3 by means of slides 6 and guides 7 are provided for the storage of food products and other perishables. In order to prevent heat leakage from the storage compartment 3 the fronts of the drawers are in the form of spaced inner and outer walls 9 and 10 with the space between the walls being filled with suitable heat insulation 11. The sides or edges of the drawers adjacent the face portion 12 of the cabinet defining the access opening to the storage compartment 3 are provided with shoulders 14 which overlie or overlap the face portions and a gasket 15 attached to the inner surfaces 16 of the shoulders 14 is provided for sealing the space between the edges of the drawers and the cabinet face portions 12 when the drawers are closed. An evaporator 17 forming part of a refrigerating system (not shown) is provided in the compartment 3 for maintaining therein the desired refrigerating temperature.

In accordance with the usual practice the shoulders 14 are extended around the entire periphery of the closure member and a suitable mullion is used to provide a gasket sealing surface comparable to the cabinet face portion 12 between adjacent closure members. By the present invention, the mullion is eliminated and sealing of the joint or space between adjacent closure members is obtained by a gasket assembly or arrangement mounted on one and preferably both of the opposed edges of adjacent closure members for sealing the space or joint when the closure members are in their normal or closed position.

For a detailed description of the arrangement for sealing the mullionless space between adjacent closure members particular reference is made to Figs. 2 and 3 of the drawing. In the illustrated modification, the respective edges 18 and 19 of the drawers 4 and 5 which extend across the access opening to the storage compartment 3 are provided with opposed recesses 20 and 21. The front walls or sides 22 of these recesses are in effect continuations of the shoulder 14 extending around the remaining edges of the drawer fronts while the rear sides 23 form part of the inner walls 9 of the drawer front. Disposed within the recesses 20 and 21 are sections 15a of the gaskets 15 which sections are suitably secured along one face to the front walls 22 of the recesses, as for example, in the same way as the remaining sections of the gaskets are secured to the remaining side or peripheral edges of the drawer fronts. These gasket sections run across the lower edge of the upper drawer front and the upper edge of the lower drawer front and are disposed in the recesses with their exposed sides 25 in substantially the same plane as the adjacent portion of the drawer front when the gaskets are in their uncompressed form.

Positioned between each of the gaskets and the inner or rear wall 23 of the recess gasket operating members which may be termed false mullion strips. These members 27 are shown in the form of long metal strips which extend across the entire length of the recesses or in other words across the access opening to the storage compartment 3. For strengthening purposes, the portions of the false mullion strips lying within the recesses 20 and 21 are provided with horizontally extending flanges 28 overlapping the recessed side of the gasket, while the opposite ends thereof, one of which is indicated by numeral 29 in Fig. 4, extend beyond the end of the recess a distance sufficient to overlap and contact the cabinet face 12 when the drawer 12 is in its closed position.

As is shown in Fig. 3 the false mullion strips 27 are mounted by means of a plurality of studs 31 on the rear or inside walls 23 of the recesses. These studs are movably mounted within apertures provided in the walls 23 and springs 32 are provided for biasing the strips 27 in a rearward direction towards or into contact with the inside walls 23 of the recesses 20 and 21. By this arrangement, the strips 27 are disposed in this retracted position when no other force is applied thereto. With the strips thus biased inwardly, the gasket sections 15a of tubular form assume their normal or uncompressed shape as shown in Fig. 3.

The application of a compressive force to the gasket section 15a when the drawer carrying that section is moved to its closed position is employed to obtain the desired sealing and is accomplished by contact of the extending end portions 29 of the false mullion strip with the face 12 of the cabinet. The false mullion strip 27 then in effect functions as a mullion extending across the access opening and substantially flush or in the same plane with the cabinet face portion 12. However the purpose of the false mullion strip in this position is not primarily to obtain a seal between it and the gasket but rather to effect a deformation of the tubular gasket as the strip contacts face 30 and compresses the gasket section to the point where it is deformed to such an extent that the side portions 25 are advanced outwardly from the recess into mating contact with the opposed portion of the adjacent closure member. When gaskets are employed on both of the adjacent closure members, the respective gasket sides 25 contact one another as shown in Fig. 2 to effect a sealing of the cabinet when the drawers are both in their closed position.

To obtain the desired sealing action and prevent undue gasket rub during opening and closing of the closure members, the tubular gasket section 15a should be so constructed and arranged that when the closure member is open and the strip 27 retracted the gasket will lie substantially within and substantially fill its recess. This is accomplished by employing a tubular gasket section whose normal or uncompressed shape is such that its opposed faces are adjacent and in substantial contact with the recess side 22 and retracted strip 27 and which, by the application of a compressive force parallel to the direction of movement of the closure member, will be deformed to a more oval shape so that the exposed side 25 will be advanced towards the adjacent closure member.

A suitable gasket is therefore one having in the compressed state a more oval shape than in its uncompressed state. Thus there can be employed any hollow tubular gasket having flexible walls which are self-supporting and composed of a material such as rubber or a vinyl compound of sufficient thickness that the gasket will not be permanently deformed by the application of a compressive force. However, since most gasket materials tend to age and take on a permanent set, the gasket employed in the practice of the present invention, or at least the recessed sections or portions 15a, is preferably of the type described and claimed in my copending application S. N. 512,221 filed May 31, 1955, and assigned to the same assignee as the present invention. The gasket includes a thin, flexible substantially non-resilient and substantially non self-supporting outer cover 33 and a resilient filler body 34 positioned within the cover, the filler body being formed of a resin bonded inorganic filamentary material such as fiber glass filaments and providing substantially all of the uncompressed forming or shaping of the gasket. The glass fibers comprising the filler body are bonded together into a springy mass by a suitable thermal set resin so that the filler body acts as a spring effective to provide substantially all of the sealing force as the gasket is compressed against the face portions 12 of the cabinet and also the forces necessary to return the gasket section 15a to its unsealed shape as shown in Fig. 3.

Therefore, in the practice of the present invention, a glass fiber filled gasket is preferred since the resin bonded fibers, particularly when the resin bond is present in amounts only sufficient to bond the contacting surfaces of the glass fiber mass has been found to provide a gasket which does not take on a permanent deformation or set even after a large number of compressions. For a more detailed description of the preferred type of resin bonded glass fiber mass reference is made to my abovementioned copending application.

By employing a synthetic rubber-like resinous material such as a vinyl compound or polyethylene plastic, in other words a material which has a smooth flexible surface in the extruded or sheet form for the gasket sheath 33, a slight frictional engagement of the side portions 25 of the gasket during drawer opening or closing does not interfere with the operation of the gasket assembly or of the drawers. When either or both of the drawers are moved from said closed position as shown in Fig. 2 towards an open position as shown in Fig. 3, the false mullion strips 27 move to their retracted position under the action of the springs 31 so that the sealing contact or pressure between the side edges 25 of the opposed gasket is quickly released to clear or substantially clear the released gasket from any further contact with the surfaces on the adjacent closure member. Upon closure of the drawers the gasket section 15a is again deformed to a more oval shape by the compressive forces applied in a direction parallel to movement of the drawer or in other words parallel to the mullionless edge thereof with a resilient deformation of the tubular gasket which advances the side portions 25 into sealing engagement with the opposed surfaces of the adjacent closure member.

From the foregoing it will be seen that there has been provided in accordance with the present invention a gasket assembly for sealing mullionless joints or spaces between adjacent closure members which is of simple and efficient construction and which furthermore permits the use of the same gasket for sealing the mullionless edges as is employed in the sealing of the remaining edges of the closure members. By eliminating the mullion which would ordinarily be required between these adjacent closure members, particularly drawer members, there is obtained a substantial increase in the storage volume of the drawers. For example if a mullion were employed as part of the sealing means between the drawers of the cabinet shown in the accompanying drawing, this mullion, in order to be effective, would have to have a total width substantially equal to the combined depths of the opposed recesses 20 and 21. The presence of such a mullion would require that the bottom 36 of the upper drawer be raised to substantially the same level of the bottom of recess 20 while the side walls 37 of the drawer 5 would have to be lowered to a plane extending substantially through the bottom of the recess 21. In other words storage volume proportional to the width of the mullion or the combined depth of the recesses 20 and 21 would be lost.

Because the gasket walls 25 expand outwardly on closure without a wiping action, the joint indicated by numeral 38 in Fig. 2 between them and the cabinet face 12 at the outer ends is substantially closed. This is possible because of the expanding action in combination with the thin wall highly flexible gasket sheath 33 which is capable of bending into the form of a relatively sharp corner or angle. Hence no special means need be employed to assure adequate sealing in the areas where the contacting gaskets overlap the face portions 12.

While the present invention has been described with reference to a specific embodiment thereof, it will be understood that modifications can be made by those skilled in the art without actually departing from the invention. Therefore, the appended claim is intended to cover all such variations as come within the true spirit and scope of the invention.

What I claim as new and desire to secure by Letters Patent of the United States is:

In combination, a cabinet having a face portion defining an access opening to said cabinet, a plurality of closure members for closing said access opening and having shoulders overlying the face portion adjacent said access opening, adjacent closure members having opposed edges spaced from one another and extending across said access opening, opposed recesses in said edges each of said recesses having front and rear side walls with the front walls forming a continuation of said shoulders, a resilient tubular gasket mounted adjacent the periphery of each of said closure members and including sections mounted on said shoulders for contacting said cabinet face portion when said closure members are closed and sections of the same gasket disposed in said recesses and mounted on said front side walls, means for effecting sealing contact of the opposed recessed sections of said gaskets on adjacent closure members when said closure members are closed, said means comprising a gasket deforming member disposed in said recess between said gasket and said rear side wall of said recess and movably supported on said rear wall, means biasing said gasket deforming member toward said rear recess side wall, each of said gasket deforming members having portions extending beyond the ends of said recess for contacting in overlapping relationship said cabinet face portion when said closure member is moved towards a closed position whereby said recessed gasket section is deformed to advance portions of the recessed gasket sections of adjacent closure members towards one another and into sealing engagement.

References Cited in the file of this patent
UNITED STATES PATENTS

| | | |
|---|---|---|
| 1,746,517 | Bohn | Feb. 11, 1930 |
| 1,918,911 | Hull | July 18, 1933 |
| 2,610,337 | McMillin et al. | Sept. 16, 1952 |
| 2,692,809 | Kesling | Oct. 26, 1954 |

FOREIGN PATENTS

| | | |
|---|---|---|
| 813,075 | Germany | Sept. 6, 1951 |